(12) United States Patent  
Feeser

(10) Patent No.: US 6,454,170 B1  
(45) Date of Patent: Sep. 24, 2002

(54) CARD BLOCKING DEVICE FOR A SMART CARD CONNECTOR

(75) Inventor: Reiner Feeser, Heilbronn (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/623,256

(22) PCT Filed: Dec. 31, 1999

(86) PCT No.: PCT/EP99/10483

§ 371 (c)(1),  
(2), (4) Date: Aug. 31, 2000

(87) PCT Pub. No.: WO00/41129

PCT Pub. Date: Jul. 13, 2000

(30) Foreign Application Priority Data

Dec. 31, 1998 (DE) .......................... 198 60 883  
Dec. 30, 1999 (DE) .......................... 199 63 777

(51) Int. Cl.⁷ ................................. G06K 7/00
(52) U.S. Cl. .................. 235/486; 235/482; 235/492
(58) Field of Search ................... 275/441, 482, 275/486, 492

(56) References Cited

U.S. PATENT DOCUMENTS 4,734,567 A * 3/1988 Hansbauer .................. 235/482  
4,814,593 A   3/1989 Reichardt et al. ........... 235/482

FOREIGN PATENT DOCUMENTS

EP 0468146 1/1992  
EP 0780785 6/1997

* cited by examiner

Primary Examiner—Harold I. Pitts  
(74) Attorney, Agent, or Firm—Blank Rome LLP

(57) ABSTRACT

A card blocking or card locking apparatus in particularly for a smart card connector of the push/push design. A blocking element which closes an opening adapted for introducing a smart card in case the card 2 is in a reading position and opens the opening 40 in case the card 2 is to be inserted or is to be removed into or from the smart card connector.

10 Claims, 2 Drawing Sheets

CARD BLOCKING DEVICE FOR A SMART CARD CONNECTOR

BACKGROUND OF THE INVENTION

1. Field of the Invention

The invention relates to a smart card connector (also referred to as a chip card reader or short as a reader) and, in particular, to a smart card connector of the push/push design (push/push smart card connector). The invention relates, in particular, to a card lock (also referred to as a card locking apparatus or card security means) for such a push/push smart card connector (push/push-reader).

2. Description of the Related Art

From German patent P 36 25 306 a smart card connector using a so-called guide or guide collar is already known. The invention also provides for an improvement in connection with said guide collar.

SUMMARY OF THE INVENTION

It is an object of the present invention to provide a smart card connector, in particular of the push/push design, such that the smart card or chip card (short: card) is not accessible after insertion. Preferably it is desired that the card is locked in a reading position. After the reading process is finished, it is desired that the card returns into an input/output position upon applying a repeated pressure against the guide or guide collar.

In accordance with the present invention a card lock is provided in particular for a push/push-reader, wherein, preferably, a reader with a flat design is used.

In accordance with the invention a card guide and protection means, preferably a centrally guided guide element, which is placed in front of the combination, which forms the actual reader. Said centrally guided guide element is preferably designed as a guide or guide collar. The guide collar together with a lever mounted thereon and a curve in the shape of a heart can form a "ballpoint pen mechanic". Consequently, the guide collar (which can generally be referred to as a guide element) can be placed in a known manner in three positions, namely:

1. a forwardly located input/output position
2. a central detent/reading position
3. a backward position/release movement According to the invention the card locking apparatus, which in particular comprises a blocking element blocking or unblocking a card slot of the reader, is designed such that the card located in the guide collar
  is blocked or locked in the centrally and backwardly located positions, and
  is released or accessible in the forwardly located position.

The blocking element is preferably a guide element, in particular a leaf guide, which is actuable due to the special design of the guide collar. For example the actuation occurs by means of a pin. The locking or blocking element serves for opening (opening position) or closing (closing position) the slot of the reader which serves for insertion and extraction of the card.

The present invention avoids malfunctions, which can occur with freely accessible cards, in particular with push/push-readers, because said push/push-readers are frequently operated incorrectly in the push/pull manner. For applications in a motor vehicle the guide collar designed according to the invention provides protection against injuries caused by projecting cards. The design of the card locking apparatus according to the invention provides for a high protection when vibrations occur.

In particular due to the fact that the locking of the card is realized directly by means of a guide element, a small height for the reader is obtained, which is advantageous in connection with a push/push-reader. For example, the height which can be obtained by the design according to the invention is smaller than 6 mm.

Further advantages, objects and details of the invention can be gathered from the description of an embodiment described with reference to the drawing:

BRIEF DESCRIPTION OF THE FIGURES OF DRAWINGS

DETAILED DESCRIPTION OF THE PREFERRED EMBODIMENT

Figure 1:
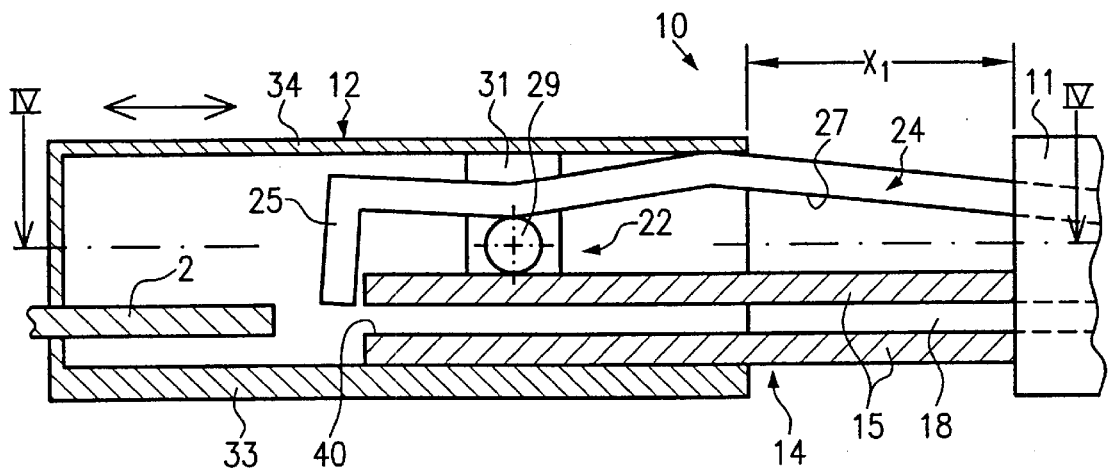
FIG. 1 is a sectional view of a push/push-reader along line I—I in FIG. 2, with the schematic sectional view showing a card locking apparatus having a blocking element for the push/push-reader.

FIG. 1 discloses a push/push smart card reader 10 (which will also be called in short a push/push reader) into which a smart card 2 can be inserted. A guide or guide collar 12 is provided similar to what is shown in German patent P 36 25 306. The smart card connector 10 comprises a housing portion 11 within which for instance a contact carriage, not shown, is reciprocally mounted. Said contact carriage can be lowered, for instance when inserting the smart card 2 (short: card or chip card 2) into the push/push reader 10 onto contact zones of the card 2.

Figure 3:
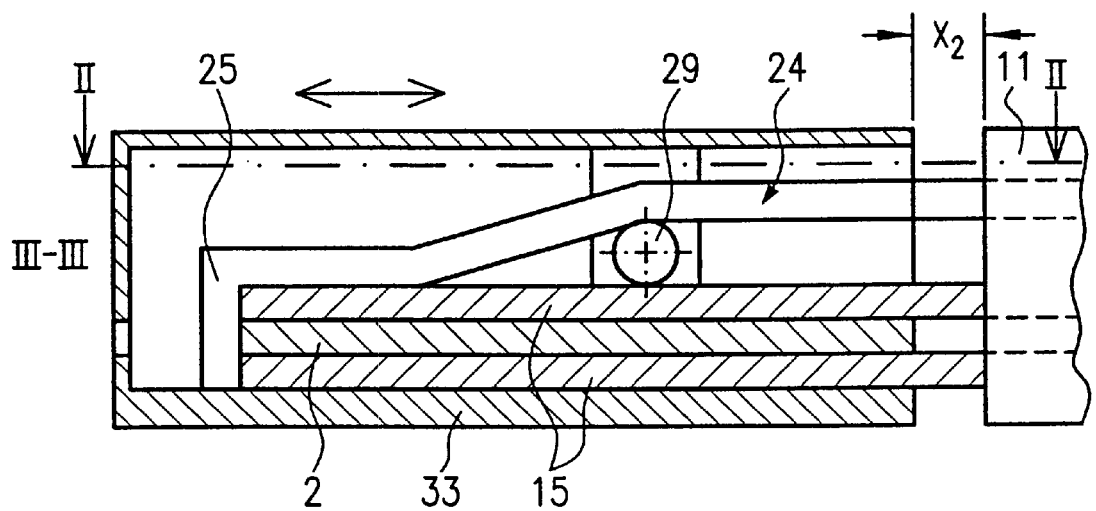
FIG. 3 is a sectional view along line III—III in FIG. 4.

The push/push reader 10 further comprises said guide collar (generally, a guide element) 12. The guide collar can be moved from the position shown in FIG. 1, i.e. the forward input/output position, towards the housing portion 11 carrying out a movement x1, so as to subsequently assume the central detent/reading position as shown in FIG. 3. If one would like to withdraw the card 2 from the central detent/reading position, then—for a smart card reader 10 of the push/push design and starting from the position shown in FIG. 3—one needs to push again onto said guide collar 12 so as to move said guide collar 12 against the force of a guide towards said housing portion 11 (said guide is not shown, but biases the guide collar 12 in the direction of the left arrowhead in FIGS. 1 and 3). After having moved over the distance x2 in the direction of the right arrowhead due to the pressure exerted manually onto the guide collar 12, the initially mentioned mechanic allows that the guide collar 12 is guided back into its frontal input/output position in accordance with FIG. 1 by means of the guide (not shown). The guide not shown in the drawing could act for instance between the guide collar 12 and the housing portion 11 so as to bias the guide or guide collar 12 into the position shown in FIG. 1. As mentioned, when moving the guide collar 12 to the housing portion 11, i.e. from the frontal input/output position to the backward position the guide collar 12 is moved against the force of said guide.

Figure 2:
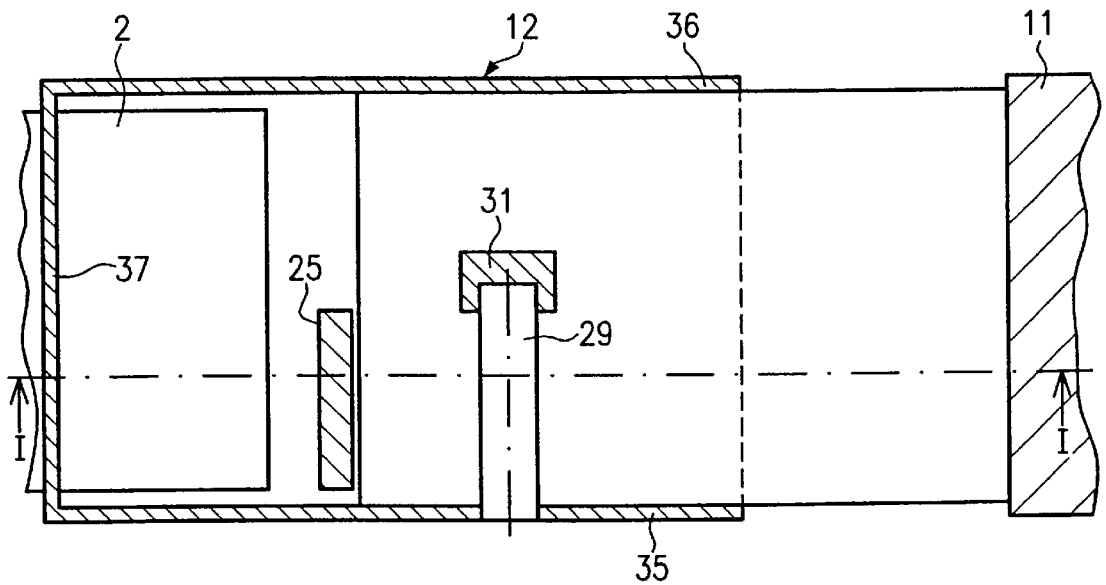
FIG. 2 is a top plan view of the card locking apparatus of FIG. 1 in its input/output position and in the open position.

The push/push smart card connector 10 of the invention uses the know initially explained mechanic, which allows that the guide collar 12 can be moved (pushed) from the position in accordance with FIG. 1 to its central detent/reading position. By means of a further movement (push) the guide collar 12 can be moved from said central detent/reading position into its backward position, a movement which initiates a release movement in leftward direction, i.e. in direction of the input/output position in accordance with FIGS. 1 and 2.

Figure 4:
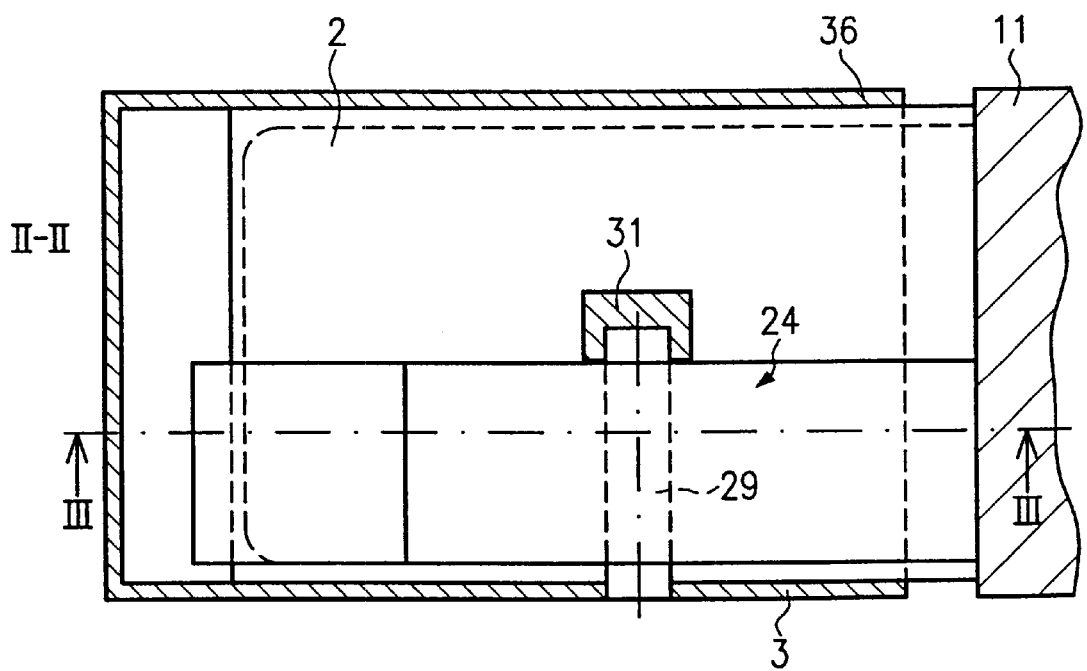
FIG. 4 is a top plan view of the card locking apparatus in accordance with FIG. 3 in the central detent/reading position with the blocking element being closed (closed position).

In accordance with the invention a card locking apparatus 22 (also called a card block or card lock) is provided. The card locking apparatus 22 secures the card 2 located in the central detent/reading position with respect to access as is shown in FIGS. 3 and 4.

The embodiment shown discloses in detail a card slot part 14 mounted at the housing portion 11. The card slot part 14 comprises upper and lower slot walls 15 as well as lateral slot walls, which are not shown. All said walls define a card slot 18, which is adapted to receive the smart card 2. The slot 18 is open towards its frontal or left end as is shown in FIG. 1 (opening 40) to allow insertion of a smart card 2. The slot 18 is also open at its oppositely located backward end so that the card 2 can project with its end carrying the contact zones into the housing portion 11. In the housing portion 11 the contacting of the contact zones of the card can be carried out for instance by the carriage carrying contact elements at the time the card 2 is located in its central detent/reading position as shown in FIG. 3.

The guide collar 12 is slideably mounted on the card slot part 14 for a reciprocal movement between the mentioned positions. The guide collar 12 comprises a lower wall 33 and an upper wall 34 as well as lateral walls 35 and 36 and a frontal wall 37. In the frontal wall 37 has a slotlike opening, so as to insert the card 2 therethrough such that the card can be located in the receiving slot 18. (As already mentioned, the guide collar 12 is also referred to as guide collar 12 inasmuch as the guide collar 12 is biased by the mentioned not shown guide into the position in accordance with FIG. 1.) It should again be emphasized that the guide collar 12 is coupled to the mentioned mechanics which guarantees the mentioned push/push sequence of motions.

The locking apparatus 22 of the invention comprises a locking or blocking element 24, which is formed, in the embodiment shown, as a leaf guide 24.

Said leaf guide is fixedly mounted with its right end (see FIG. 1) for instance at housing portion 11 in any suitable manner, and the leaf guide tends to assume the position shown in FIG. 3 closing the card slot 18 due to the inherent guide action. For the actuation of the blocking element 24 control means are provided, preferably in the form of a pin 29. The leaf guide 24 can be a metal guide or a plastic guide.

The blocking element 24 does not extend across the entire width of the guide collar 12, see FIG. 4, but only across about half of the width. The blocking element 24 comprises further, as is shown in FIG. 1, an angled cam surface 27. Said cam surface 27 is in abutment with the cam surface 27 of the control means, which is provided preferably in the form of a pin 27, due to the guide force, which is preferably inherent to said blocking element 24. The pin 29 is in turn connected by means of a wall portion 31 to the guide collar 12. As can be seen in FIG. 4, pin 29 is not only held in the wall portion 31, but also with its oppositely located end in the side wall 35. Thus, when the guide collar 12 is moved from the position shown in FIG. 1 into the position shown in FIG. 3, then the cam surface 27 can slide on the pin 29 and the blocking element 24 is lowered. In this manner a wall portion 25 mounted at the left end (see FIG. 1) of the control element 24) moves in front of the left opening 40 to the slot 18 and closes said slot. If the guide collar 12 is moved in the opposite direction, then the guide slot 18 is opened again.

Preferably the guide collar 11 is coupled to the reciprocally mounted carriage, which carries contact elements, such that for a movement of the guide collar 12 towards the housing portion 11 the moveable contact support carriage is lowered towards the contact zones of the card 2.

What is claimed is:

1. A card blocking or card locking apparatus for a smart card connector of the push/push design comprising a blocking element which blocks an opening adapted to introduce the smart card in case the card is located in a reading position and which opens the opening in case the card needs to be introduced or taken out of the smart card connector, wherein the blocking element is a leaf guide, which is biased into a position closing said slot and can be opened by a control means against the biasing force.

2. The card blocking apparatus of claim 1, wherein a guide element is reciprocally mounted in a direct or indirect manner at the smart card connector and actuates dependent on its movement the blocking element, which in turn opens or closes said opening.

3. The card blocking apparatus of claim 1, comprising control means for the actuation of said blocking element.

4. The card blocking apparatus of claim 3, wherein said control means are mounted on the guide element.

5. The blocking apparatus of claim 3, wherein the control means are provided in the form of a pin.

6. The card blocking apparatus of claim 5, wherein said pin cooperates with a cam surface of the card blocking apparatus so as to open or close an opening of a slot.

7. The card blocking apparatus of claim 1, wherein the leaf guide is a plastic guide or a metal leaf guide which is fixedly mounted at its one end at the push/push smart card reader or a housing portion, while the other free end is angled and forms a locking wall portion, so that a generally hook-shaped form results.

8. The card blocking apparatus of claim 1, wherein the guide element is biased by a guide into an opening position and is moveable against the force of said guide on a card slot part towards the push/push smart card connector.

9. A card blocking apparatus according to claim 1, wherein the guide element is a guide collar.

10. The card blocking apparatus of claim 1, wherein a mechanic is provided, which provides for the guide collar a frontal input/output position, a central detent/reading position and a backward position, the latter providing for the release movement.

* * * * *